(12) United States Patent
Anderson et al.

(10) Patent No.: US 7,311,741 B2
(45) Date of Patent: Dec. 25, 2007

(54) DEVICE FOR SEPARATING DUST AND DIRT OUT OF FLOWING MEDIA

(75) Inventors: Gordon Anderson, Baden (CH);
Reinhard Fried, Baden (DE);
Shailendra Naik, Gebenstorf (CH);
Stefan Schlechtriem, Taegerig (CH);
Thomas Zierer, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 463 days.

(21) Appl. No.: 10/495,227

(22) PCT Filed: Nov. 8, 2002

(86) PCT No.: PCT/IB02/04716

§ 371 (c)(1),
(2), (4) Date: Dec. 21, 2004

(87) PCT Pub. No.: WO03/041842

PCT Pub. Date: May 22, 2003

(65) Prior Publication Data

US 2005/0076622 A1   Apr. 14, 2005

(30) Foreign Application Priority Data

Nov. 13, 2001   (CH) .................................. 2082/01

(51) Int. Cl.
*B01D 45/12* (2006.01)
(52) U.S. Cl. ............................. 55/337; 55/339; 55/423; 55/459.1; 55/466
(58) Field of Classification Search .................. 55/337, 55/338, 339, 340, 413, 459.1, 459.3, 466
See application file for complete search history.

(56) References Cited

U.S. PATENT DOCUMENTS

| 515,259 A | * | 2/1894 | Skinner | ........................ 55/340 |
| 2,152,114 A | * | 3/1939 | Van Tongeren | .............. 55/398 |
| 3,907,671 A | | 9/1975 | Baigas, Jr. | |

FOREIGN PATENT DOCUMENTS

| DE | 2329248 | 2/1975 |
| DE | 19834376 A1 | 2/2000 |
| EP | 0529773 A2 | 3/1993 |
| GB | 2164391 A | 3/1986 |

* cited by examiner

*Primary Examiner*—Robert Hopkins
(74) *Attorney, Agent, or Firm*—Buchanan Ingersoll & Rooney PC

(57) ABSTRACT

The invention describes a device for separating dust and dirt out of flowing media. A curved flow path (1) is imposed on the flow (21), and heavy foreign bodies are separated out of the main flow by centrifugal force. The partial stream required to carry away the foreign bodies is aftertreated in a filter (11) and returned in purified form. Unlike with conventional filters, which have to process the entire flow of media, pressure losses during the separation of dust are minimized, and on the other hand no medium is lost for removing the dust load.

13 Claims, 3 Drawing Sheets

DEVICE FOR SEPARATING DUST AND DIRT OUT OF FLOWING MEDIA

FIELD OF THE INVENTION

The present invention relates to a device for separating dust and dirt out of flowing media in accordance with the preamble of claim 1. Separators of this type are used, for example, to treat a cooling medium for cooling components of a turbomachine, such as for example guide vanes of a gas turbine.

Sufficient and reliable cooling of components of a turbomachine represents an important aspect in the operation of the turbomachine. To achieve a high level of efficiency, modern high-temperature gas turbines require a cleverly designed cooling system, in particular for cooling the highly loaded turbine blades and vanes. Therefore, the turbine blades and vanes have cooling passages or cavities which form cooling passages passing through them, and a cooling medium, in particular cooling air, flows through these passages or cavities while the installation is operating. Generally, numerous cooling-air bores, through which the cooling medium can pass from the interior of the blades and vanes to the outside, are provided in the initial region of the turbine blades or vanes, at the leading edge thereof. In this region, a cooling-air film which protects the turbine blades and vanes from excessive heating is formed on the surface. In the same way, corresponding cooling-air bores are also present at the trailing edge of the turbine blades and vanes.

In many cases, the cooling medium is formed by a fraction of the air which has been compressed by the compressor stage or has bypassed the latter and is fed to the cooling passages via one or more feed passages.

One problem which is encountered in the operation of a turbomachine cooling system of this type is that of the cooling passages or cooling-air bores becoming blocked by dirt or dust particles, which may originate from the atmosphere or from components of the turbomachine located upstream of the cooling passages and are introduced into the cooling passages with the cooling medium. A blockage of individual cooling passages or cooling-air bores may lead to a considerable local temperature load on the component to be cooled, and possibly even to the component being damaged.

DISCUSSION OF BACKGROUND

The use of retention filters for purifying cooling air, which in itself is obvious, causes very high pressure losses and is therefore unsuitable.

Therefore, to avoid or reduce the risk of blockages, it is known to arrange separators, such as for example cyclones, within the cooling circuit, separating dust or dirt particles from the cooling medium. In these separators, vortices are produced in the cooling medium, causing the dust and dirt particles to be separated from the cooling medium on account of their inertia, and these dust and dirt particles are then carried away via a separate dust discharge opening.

The use of a separator of this type in the form of an axial cyclone is described in DE 198 34 376 A1. The cooling air coming from the compression stage is in this case passed through the axial cyclone before it enters the first guide vane of the turbine stage. A swirl generator is formed in the cyclone, generating a vortex in the cooling air, as a result of which the dust and dirt particles, which have a greater inertia, strike the wall of the cyclone, where they drop downward. At the bottom of the cyclone, they are sucked out via corresponding discharge passages. One drawback of a separator of this type, however, consists in the fact that it takes up considerable additional installation space, which is not always available in turbomachines. Therefore, separators are often used only for applications in which the cooling air can be guided out of the inner region of the turbomachine, purified in the separator outside the inner region and then returned to the inner region in order to cool the corresponding components.

Also known are dust and dirt separators in which the flowing medium, i.e. in this case in particular the cooling air, enters tangentially with respect to a circular or preferably helical flow guide path, where it is guided on a curved path into an inner outflow segment, where the direction of flow is diverted in such a manner that the outflow is axial, substantially normal with respect to the inflow and with respect to the plane of curvature of the circular or helical path. The curved flow of the medium in the guide passage causes dust and dirt particles to be centrifuged toward a radially outer wall of the guide passage. Therefore, dust discharge openings are arranged at the radially outer wall of the flow passage, via which openings a part-stream of the medium discharges the dust and dirt particles in such a manner that the remaining flow, which enters the central outflow segment, is substantially free of impurities in particle or drop form. These separators are of very compact structure on account of the arrangement of the curved guide passage around a central outflow segment. Since the medium is not flowing through retention filters, the overall pressure losses are also low. Separators constructed according to this principle have been disclosed, for example, by GB 2 164 391 and U.S. Pat. No. 3,907,671. However, these separators consume a part-stream of the medium supplied in order to discharge the dust load. In particular in the cooling system of a gas turbine, however, this is compressed air which has been taken away from the process. It is uneconomical and highly undesirable to discard this partial mass stream which has been partially prepared in a complex way.

SUMMARY OF THE INVENTION

The invention characterized in the claims is based on the object of avoiding the drawbacks of the prior art in a device in accordance with the preamble of claim 1. In particular, it is intended to specify a separation device which takes up little space, causes little pressure loss and does not require a lost mass stream in order to remove the dirt load.

The object is achieved by the device described in patent claim 1. Advantageous configurations of the device form the subject matter of the subclaims given below.

Therefore, the core concept of the invention is that of passing the part-stream which is required to discharge the dust and dirt load via the dust discharge opening into a bypass flow path which preferably includes a dust chamber, with the bypass flow path being in communication with the guide passage via a return opening, a retention filter being arranged in the flow path between the dust discharge opening and the return opening. In this way, the part-stream which is required in order to carry away the dust load, after cleaning in the retention filter, is fed back to the usable stream of medium, and the loss of a part-stream is thereby avoided. Only a part-stream of the medium as a whole flows through the retention filter, with the result that the total pressure losses which result, in particular for a limited overall size of the retention filter, are significantly lower than if the entire flow of medium were to flow through it. The pressure losses can easily be compensated for by the return opening opening out into the guide passage at a suitable location of low static pressure. For example, the guide passage may be provided in a section with a venturi-like convergent-divergent contour, in which case the return opening opens out in the region of the nozzle throat, i.e. the narrowest cross section, of the venturi nozzle formed in this way. There is also a low static pressure in the central outflow segment, in particular in its center, in such a form that it is advantageous to allow the return opening to open out in this region or for an extension element to be provided, opening out in the center of the central outflow segment. A particularly compact design of the device is realized if the guide passage, at least in sections, is arranged in the shape of a segment of a circle or preferably in the shape of a spiral around a central outflow segment. This outflow segment is part of the guide passage. The inflow opening and the outflow opening, which predetermine the inflow direction and the outflow direction, are advantageously arranged in such a way that the inflow direction and the outflow direction are oriented substantially normally with respect to one another. In one preferred embodiment, the inflow direction is oriented tangentially, and the outflow direction axially, with respect to an imaginary cylinder.

In one configuration of the invention, the bypass flow path has a dust chamber, in which the retention filter can very particularly expediently be arranged. The dust chamber is preferably arranged directly adjacent to the dust discharge opening, where it decelerates the flow and makes it more uniform before it flows to the retention filter.

When this device is operating, the medium with the dust and dirt particles which it contains flows via the inflow opening into the guide passage. Within the curvature of the guide passage, centrifugal forces act on the dust and dirt particles, so that these particles are concentrated in the flow in the region of the outer wall of the curvature. The dust outlet opening, through which the majority of the dust and dirt particles contained in the flow is discharged on account of the centrifugal force, is located in this region. The majority of the flow of cooling medium, which contains a significantly lower amount of dust and dirt particles— primarily relatively small and lightweight particles—after it has passed through the curvature, is guided through the guide passage to an outflow opening. Via the outflow opening, the cleaned cooling air is fed to the components which are to be cooled. The fraction of the cooling medium which is required to discharge the dust is filtered and cleaned and then likewise fed back to the guide passage.

The present device is suitable in particular for separating relatively large dust or dirt particles, of the order of magnitude of approximately 100 μm to 5 mm, out of a flow, in particular a cooling-air flow for gas turbines. On account of the simple structure of the present device, which merely has to comprise a corresponding curved guide passage, the device can be used even for installations in which little space is available. Furthermore, there is no strong swirl formed in this device, and only a part-stream of the medium is passed via retention filters, and consequently the pressure loss across the device is only low. Furthermore, by using a suitable arrangement of the return flow, it is possible to compensate for the total pressure loss caused by the retention filter as a result of it opening out into the guide passage at a location of reduced static pressure.

The mode of action of the device according to the invention can be described in simplified form as the centrifugal effect in the curved guide passage causing dirt particles to accumulate in a radially outer region of the curved passage. Instead of the entire flow of medium being passed through retention filters, only a dust- and dirt-enriched part-stream is passed through retention filters. The greatly reduced mass flow which has to flow through the filter allows the overall size of the filter to be reduced, with, at the same time, a lower total pressure loss. It is preferable for the filtered part-stream to open out in a region of reduced static pressure in the guide passage, so that the flow is boosted by the retention filter in the manner of a jet pump, with the result that the total pressure loss is compensated for. Furthermore, the effect is also boosted by the fact that a higher pressure is in any case present at the radially outer wall of the guide passage, i.e. at the location where the particle-laden part-stream is removed.

In one preferred embodiment of the invention, the curvature of the guide passage runs substantially in one plane. In this case, the outflow opening is preferably designed in such a manner that it allows the outflow of the cleaned cooling air to take place substantially normally, i.e. perpendicular, with respect to this plane.

Further preferred embodiments of the invention relate to the configuration of the retention filter arranged in the bypass flow path, in particular in the dust chamber. The retention filter advantageously comprises a sequence of flow restrictions and expansion chambers. Configurations of this type include, for example, open-cell foams, with metal foams being particularly suitable in this context. Stamped lamellae fitted on top of one another with elevations and recesses arranged alternatively at the surface can also be used for this purpose. Unlike filter mats, with porous filters of this type deposited dirt particles do not block the cross sections of flow. Rather, the mode of action is for the dust-laden flow to flow through a flow restriction, the free cross section of flow of which is dimensioned to be larger than the particles, and then passes into an expansion chamber. Vortex flows are formed in the expansion chamber. Dust particles are included in these vortex flows. Once they have been deposited in dead-water regions of the expansion chambers, it becomes virtually impossible for the particles to rejoin the flow. A sequence of a large number of flow restrictions and expansion chambers of this type causes dust and dirt particles to be virtually completely separated out of the flow. The individual expansion chambers have a volume which is very large by comparison with the particles, and consequently their retention capacity is very high, with the result that fundamentally maintenance-free operation for prolonged periods of time, for example between two scheduled inspections of a gas turbine, is possible without the pressure losses which result increasing. In another embodiment of the invention, at least two filters are arranged in parallel in terms of flow in the bypass flow path, in which case the medium can be made to flow through these filters as alternatives by means of a switching member arranged in the bypass flow path or by means of two individually actuable shut-off members. It is therefore also possible for medium to flow through one filter in each case while one filter is isolated from the flow, in such a manner that when the device is operating one filter element can be exchanged if necessary.

BRIEF DESCRIPTION OF THE DRAWINGS

The present invention for separating dust and dirt out of flowing media, also referred to below as a dust separator, is explained once again in brief on the basis of exemplary embodiments in conjunction with the drawings, in which, in detail.

DESCRIPTION OF THE PREFERRED EMBODIMENTS

Figure 1:
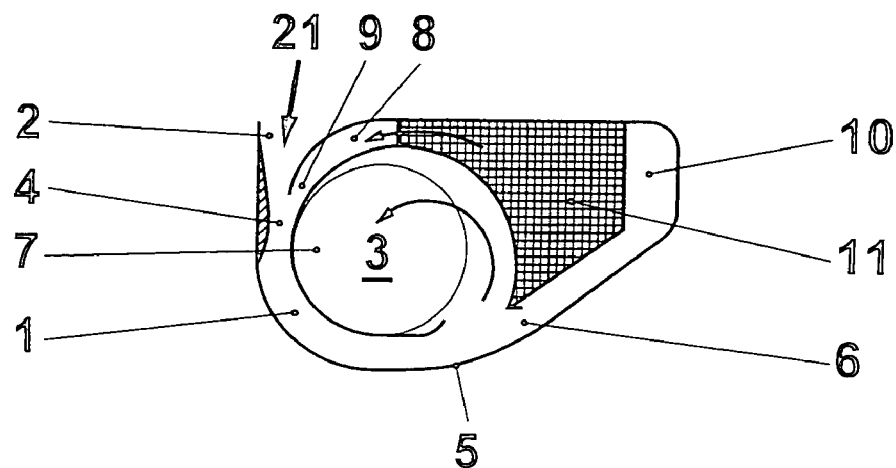
FIG. 1 shows a first exemplary embodiment of the invention.
Figure 2:
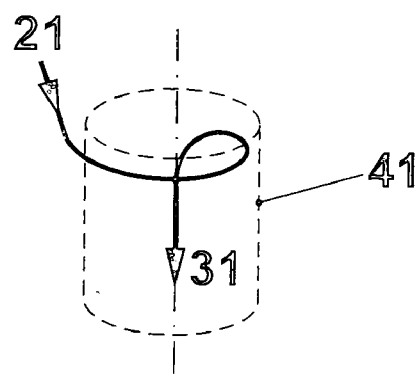
FIG. 2 shows a sketch illustrating the three-dimensional main flow pattern in a device in accordance with FIG. 1.

FIG. 1 shows a first exemplary embodiment for a realization of the present device in cross section. The main flows of media are illustrated by arrows. The figure reveals the guide passage 1, which has a curvature between an inflow opening 2 for the cooling medium and an outflow opening 3. The outlet opening 3 itself is arranged in a central outflow segment 7. The arrangement of the inflow opening and the outflow opening in this case predetermine the inflow and outflow directions. FIG. 2 illustrates the flow configuration in three-dimensional form. In the exemplary embodiment illustrated, which represents a particularly space-saving design in which the guide passage 1 is arranged helically around a central outflow segment 3, the outflow 31 is oriented substantially normally with respect to the inflow 21. The inflow 21 takes place substantially tangentially and the outflow axially with respect to an imaginary cylinder 41. Referring once again to FIG. 1, it can be seen that the guide passage 1, in the region of the passage curvature, is delimited by a radially outer wall 5. There, on the radially outer side in the region of the curvature, there is a dust discharge opening 6 which opens out into a bypass flow path 8. The bypass flow path is in turn in communication with the guide passage via a return opening 9. In the example illustrated, the guide passage 4 has a convergent-divergent venturi nozzle 4. The return flow opening 9 is arranged in the region of the nozzle throat, i.e. at the location of the highest flow velocity and therefore a low static pressure. This contour therefore acts analogously to a jet pump on the flow in the bypass passage 8. Since the dust discharge opening 6 is arranged at a radially outer location of a curved flow passage, a high static pressure prevails there, with the result that the driving pressure drop across the bypass passage 8 is maximized. Furthermore, the bypass flow path includes a dust chamber 10, in which a retention filter 11 is arranged. The dust chamber 10 assists with uniform flow onto the retention filter. The retention filter is preferably designed as a porous bulk filter, which will be explained in more detail below. In the curvature of the guide passage 1, dust particles are centrifuged out and guided via the dust discharge opening 6 into the bypass flow path, where a part-stream of the medium which is enriched with dust and if appropriate drops passes through the dust chamber 10 into the filter 11, where impurities are separated out. Cleaned gaseous medium passes back into the guide passage 1 via the return opening 9. In the case of the cleaning of cooling air in a device according to the invention, therefore, no cooling air is lost for the purpose of discharging impurities.

However, the part-stream which has been cleaned in the retention filter 11 is mixed again with contaminated incoming medium, and as a result the flow of medium to be treated by the device is increased.

Figure 3:
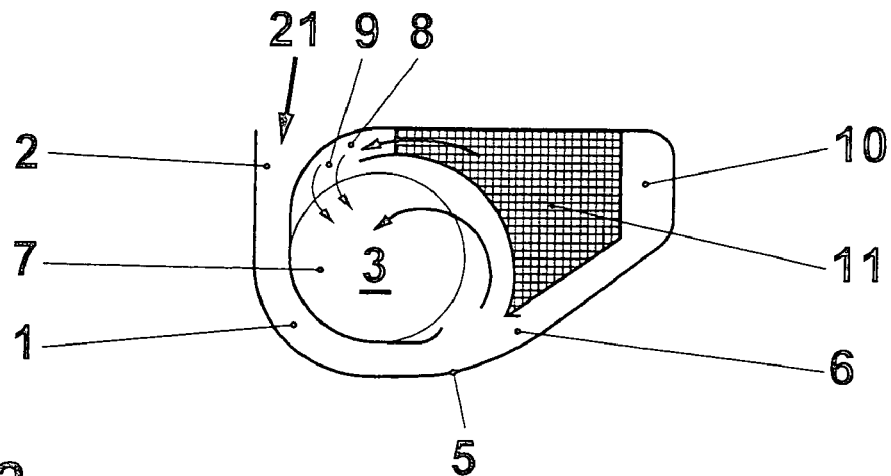
FIGS. 3 and 4 show further embodiments of a device according to the invention.
Figure 4:
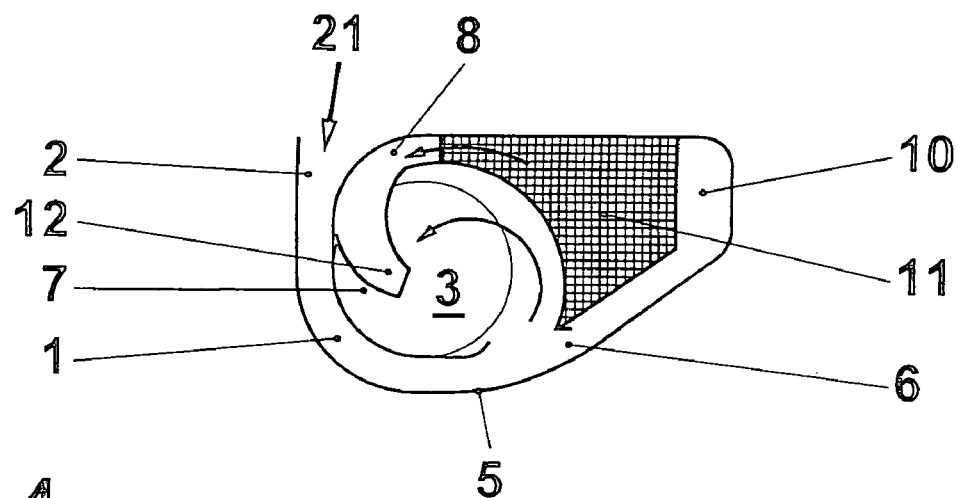

This drawback is avoided in the embodiment shown in FIGS. 3 and 4. In the embodiment shown in FIG. 3, the return opening 9 opens out directly in the central outflow segment 7. Therefore, the part-stream which has been cleaned in the retention filter 11 is fed direct to the medium which has been cleaned by means of the centrifugal force separation. In accordance with FIG. 4, the return flow opening has an extension element 12 which opens out centrally in the outflow segment 7, where a very low static pressure prevails. This in turn increases the driving pressure drop across the retention filter 11. In this case, by comparison with the embodiment illustrated in FIG. 1, although the mixing of cleaned and contaminated medium is avoided, should impurities break through the retention filter 11 they pass directly, together with the medium which has previously been cleaned, through the outflow opening 3 into dirt-sensitive regions. This is prevented, on the other hand, in the embodiment shown in FIG. 1, since in that case the medium flowing out of the retention filter 11 must first of all pass through the centrifugal separation once again before exiting the device.

Figure 5:
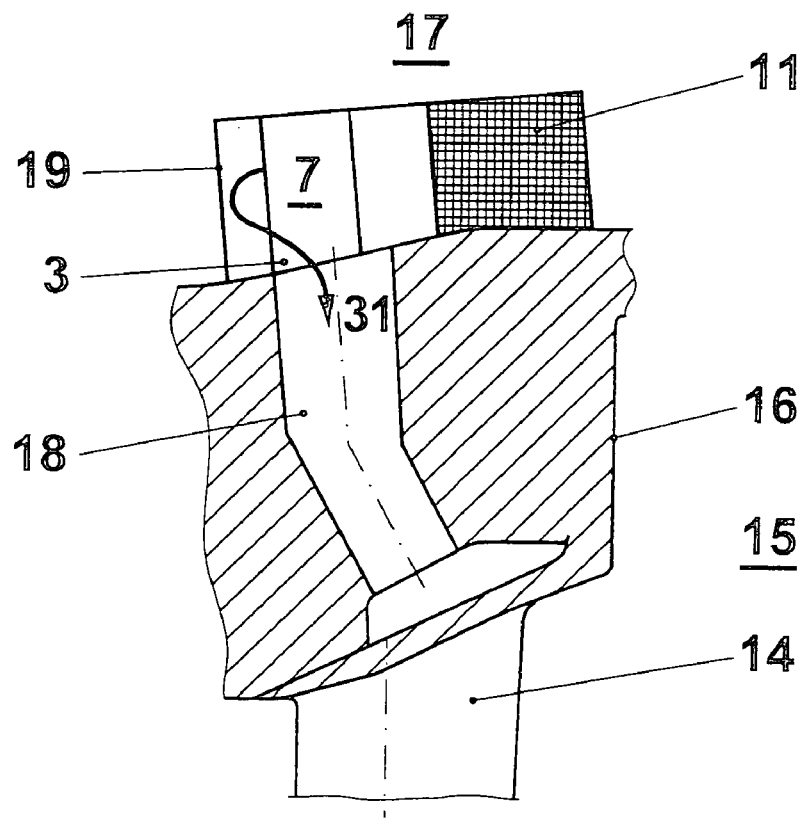
FIG. 5 shows an example for using the device according to the invention in the cooling system of a gas turbine.

FIG. 5 diagrammatically depicts the use of a device according to the invention for treating cooling air in a gas turbine installation. FIG. 5 shows an excerpt from an installation of this type with a guide vane 14 of the first ring of guide vanes and a combustion chamber 15 with combustion chamber wall 16. Cooling air is provided in a cooling air plenum 17. Some of the cooling air is to be fed via a cooling-air passage 18 and a manifold to the vanes of the first ring of guide vanes. The vanes in this case have very thin film cooling bores, which are therefore sensitive to dust, and for this reason high purity demands are imposed on the cooling air supplied. Therefore, this part of the cooling air is passed through a dust separator 19 according to the invention, the outflow opening 3 of which is in communication with the cooling-air passage 18 and onto which cooling air flows from the cooling-air plenum 17. Therefore, cooling air 31 which has been treated by the dust separator 19 enters the cooling-air passage.

All the embodiments illustrated have the advantage over a conventional arrangement of a filter in a feed passage for the cooling medium that the pressure drop between the inlet of the cooling air and the outlet passages does not increase significantly if the filter becomes blocked by the dust particles.

Figure 6:
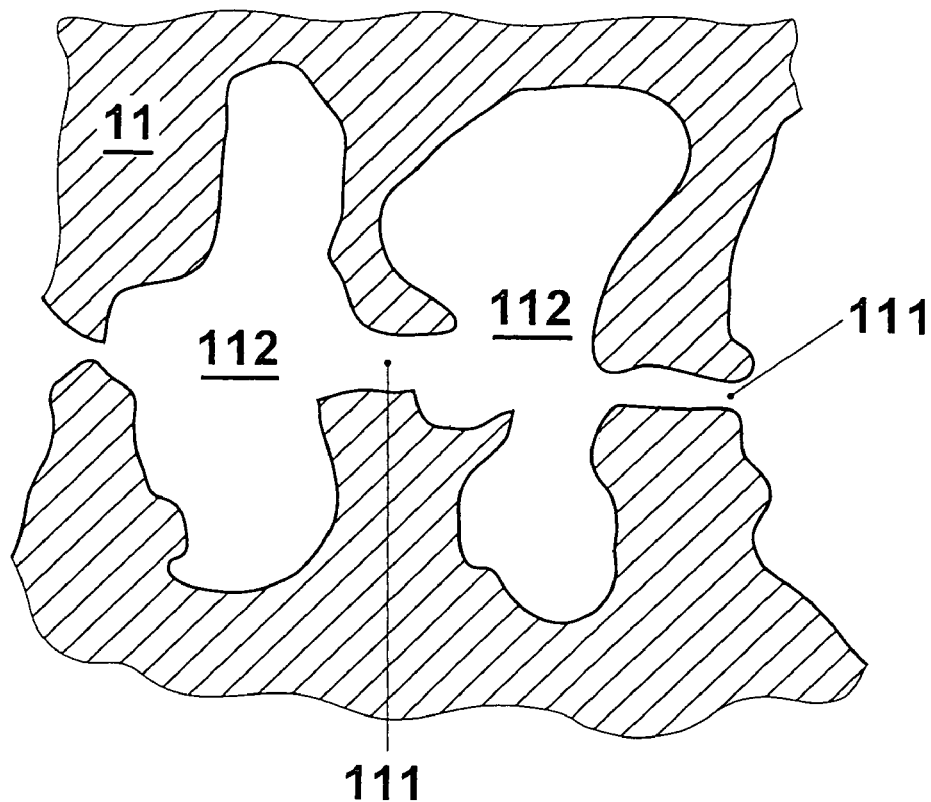
FIG. 6 shows an enlarged excerpt from a retention filter which is preferred in accordance with the invention.

FIG. 6 illustrates an example of a retention filter 11 formed from an open-cell foam. The filter forms a sequence of flow restrictions 111, i.e. actual constrictions in the cross sections of flow, and expansion chambers 112. The cross sections of flow of the restrictions 111 are large enough for the impurities to be able to pass through them, so that the filter does not actually become blocked with an increase in the pressure loss. Rather, large-volume vortices are formed in the expansion chambers 112. Particles are deposited in dead-water regions formed there and are retained by the expansion chambers. The storage capacity of an open foam of this type is very great, and consequently such foams can usually be used virtually without maintenance for a very prolonged period of time. The production of open-cell foams of this type, for example from plastics, ceramics or metal, is a process with which the person skilled in the art will be familiar and requires no further discussion at this point. It is likewise possible for a retention filter of this type to be produced by plate-like elements having, for example, a stamped surface which includes elevations and/or recesses to be laminated on top of one another.

Figure 7:
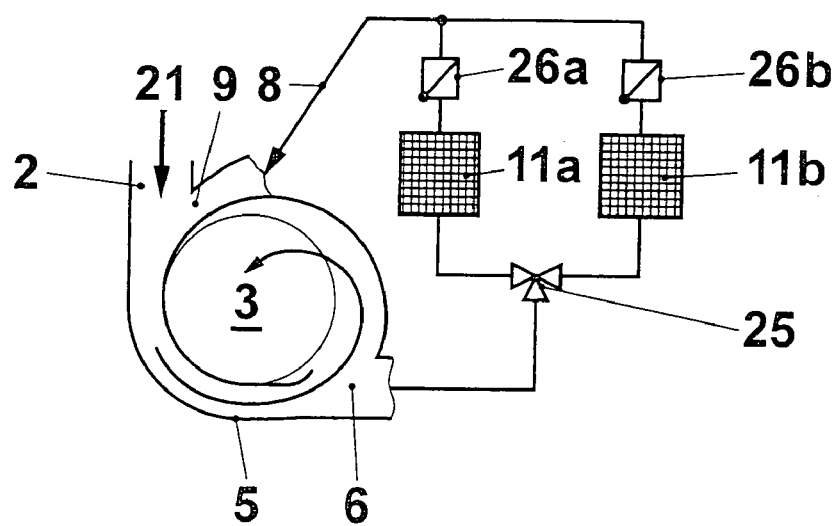
FIG. 7 diagrammatically depicts a further embodiment of the invention.

Should more frequent maintenance of the retention filter be required, it is possible to use the embodiment illustrated diagrammatically in FIG. 7. In this case, the bypass flow path includes two filter elements 11a and 11b arranged in parallel in terms of flow. A 3/2-way valve enables the dust-laden bypass flow from the dust discharge opening 6 to be applied to in each case one of the filters. The nonreturn members 26a and 26b arranged downstream of the filter elements ensure complete isolation of the filter element which is in each case not in use. Consequently, provided that they are mechanically accessible from the outside, it is possible for maintenance work to be carried out on one of the filter elements 11a and 11b without interrupting the overall operation, while the deposition device continues to operate with the medium in each case flowing through the other filter element.

It will be readily understood that the device according to the invention can also be provided in a different configuration and different arrangement in a turbomachine.

LIST OF DESIGNATIONS

1 Guide passage
2 Inflow opening
3 Outflow opening
4 Venturi nozzle
5 Outer wall of the curvature
6 Dust outlet opening
7 Central chamber, outflow segment
8 Bypass passage
9 Return opening
10 Dust chamber
11,11a, 11b Retention filter
12 Extension element
14 Guide vane
15 Combustion chamber
16 Combustion chamber wall
17 Cooling-air plenum
18 Cooling-air passage
19 Dust separator
21 Inflow to the dust separator
25 Switching member, 3/2-way valve
26a, 26b Nonreturn member
31 Outflow from the dust separator
41 Imaginary cylinder
111 Flow restriction
112 Expansion chamber

The invention claimed is:

1. A device for separating dust and dirt out of a flowing medium, comprising an inflow opening, an outflow opening and a guide passage for the flowing medium, which guide passage extends from the inflow opening to the outflow opening, the guide passage having a curvature which is delimited by a radially outer wall, and which device also has at least one dust discharge opening which is arranged in the radially outer wall in the curved section of the guide passage, wherein the dust discharge opening opens out in a bypass flow path which is in communication with the guide passage via a return opening, a retention filter being arranged in the bypass flow path between the dust discharge opening and the return opening.

2. The device as claimed in claim 1, wherein the bypass flow path includes a dust chamber.

3. The device as claimed in claim 2, wherein the retention filter is arranged in the dust chamber.

4. The device as claimed in claim 1, wherein the guide passage, at least in sections, is arranged in the shape of a circle and/or spiral around a central outflow segment.

5. The device as claimed in claim 1, wherein the guide passage includes a convergent-divergent passage section, and the return opening opens out into the guide passage in the region of the nozzle throat formed there.

6. The device as claimed in claim 4, wherein the return opening opens out into the central outflow segment.

7. The device as claimed in claim 6, wherein an extension element, which opens out in the center of the central outflow segment, is arranged at the return opening.

8. The device as claimed in claim 1, wherein the retention filter comprises a sequence of flow restrictions and expansion chambers.

9. The device as claimed in claim 1, wherein the retention filter comprises an open-cell foam.

10. The device as claimed in claim 1, wherein the retention filter comprises a porous metal foam.

11. The device as claimed in claim 1, wherein at least two retention filters, which are arranged in parallel in terms of flow and through which medium can flow as alternatives, are arranged in the bypass flow path.

12. The device as claimed in claim 1, in which an inflow direction and an outflow direction are predetermined by the arrangement of the inflow opening and the outflow opening, wherein the outflow direction is oriented substantially normally with respect to the inflow direction.

13. The device as claimed in claim 1, in which an inflow direction and an outflow direction are predetermined by the arrangement of the inflow opening and the outflow opening, wherein the inflow is oriented substantially tangentially, and the outflow substantially axially, with respect to an imaginary cylinder.

* * * * *